(12) United States Patent
Mobin et al.

(10) Patent No.: US 10,223,322 B2
(45) Date of Patent: Mar. 5, 2019

(54) SYSTEMS AND METHODS FOR CHANNEL INFORMATION EXCHANGE IN A PCIE ENVIRONMENT

(71) Applicant: Avago Technologies International Sales Pte. Limited, Singapore (SG)

(72) Inventors: Mohammad Mobin, Orefield, PA (US); Anup Tirumala, San Jose, CA (US); Haitao Xia, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 323 days.

(21) Appl. No.: 15/132,147

(22) Filed: Apr. 18, 2016

(65) Prior Publication Data

US 2017/0300451 A1 Oct. 19, 2017

(51) Int. Cl.
*G06F 13/20* (2006.01)
*G06F 13/42* (2006.01)
*G06F 13/12* (2006.01)

(52) U.S. Cl.
CPC .......... *G06F 13/4282* (2013.01); *G06F 13/12* (2013.01)

(58) Field of Classification Search
CPC ............................. G06F 13/12; G06F 13/4282
See application file for complete search history.

(56) References Cited

U.S. PATENT DOCUMENTS

2016/0321200 A1* 11/2016 Long ................... G06F 13/1668
2018/0004615 A1* 1/2018 Breakstone ......... G06F 13/4282

* cited by examiner

*Primary Examiner* — Idriss N Alrobaye
*Assistant Examiner* — Richard B Franklin
(74) *Attorney, Agent, or Firm* — Sheridan Ross P.C.

(57) ABSTRACT

Embodiments are related to systems and methods for data transfer, and more particularly to systems and methods for providing non-standard bus information.

20 Claims, 4 Drawing Sheets

SYSTEMS AND METHODS FOR CHANNEL INFORMATION EXCHANGE IN A PCIE ENVIRONMENT

FIELD OF THE INVENTION

Embodiments are related to systems and methods for data transfer, and more particularly to systems and methods for providing non-standard bus information.

BACKGROUND

A number of data transfer systems have been developed which typically involve addressing a device by a host, and waiting for the device to respond to the host. Such communication methods are typically well documented and used to access the device by any master on the data transfer system. Such transfer approaches typically allow anyone on the data transfer system to access the device and/or utilize information transferred from the device. This open ended communication limits an ability for communication between a host and a device to remain somewhat undiscoverable.

Hence, for at least the aforementioned reasons, there exists a need in the art for advanced systems and methods for assuring proper transfers.

SUMMARY

Embodiments are related to systems and methods for data transfer, and more particularly to systems and methods for providing non-standard bus information.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
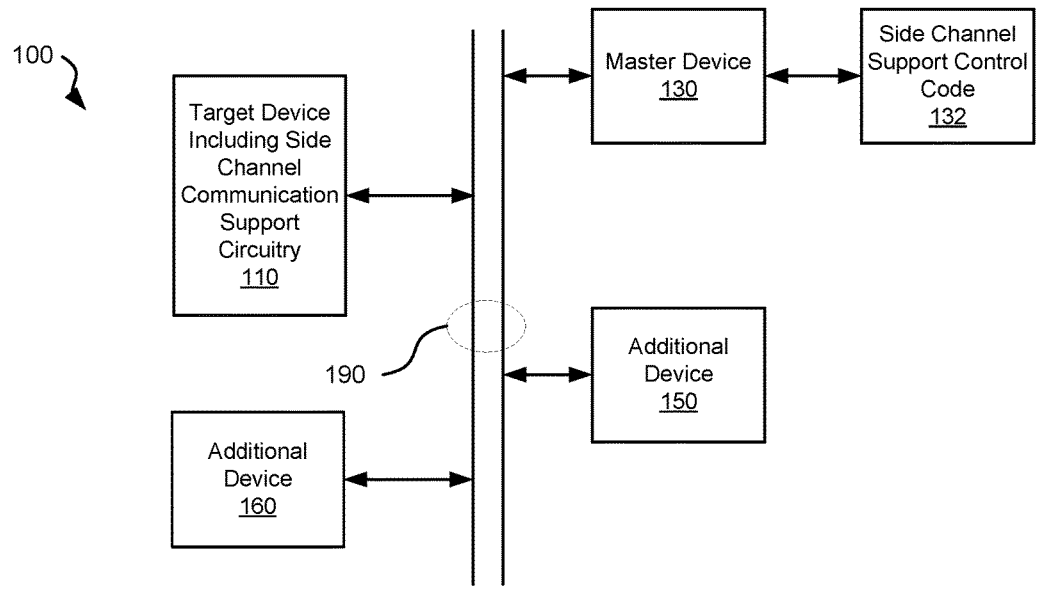
FIG. 1 shows a bus based system including a target device having side channel communication support circuitry in accordance with various embodiments of the present inventions.

Embodiments are related to systems and methods for data transfer, and more particularly to systems and methods for providing non-standard bus information.

Various embodiments of the present inventions provide data processing systems that include a target device. The target device includes: a standard communication circuit and a side channel communication system. The side channel communication system includes: a first side channel communication circuit; a second side channel communication circuit where all of the standard communication circuit, the first side channel communication circuit, and the second side channel communication circuit communicate via a common bus but by different communication mechanisms; and a side channel selector circuit operable to select one of the first side channel communication circuit or the second side channel communication circuit to perform side channel communications for the target device. In some instances, the target device is a storage device.

In some instances of the aforementioned embodiments, the common bus is a PCIe™ bus. The first side channel communication circuit may be, but is not limited to: a circuit operable to communicate via a PCIe™ configuration space, a circuit operable to communicate via a PCIe™ extended capability structure, or a circuit operable to communicate via a PCIe™ stack. In various instances of the aforementioned embodiments, the systems further include a master device operable to communicate with the target device via the common bus. In some cases, the standard communication circuit provides access to a public location within the target device, and the side channel communication system provides access to a non-public location within the target device. In particular cases, the master device is operable to communicate with the target device via the common bus, where the master device accesses the public location directly using a mechanism implemented in the master device, and the master device accesses the non-public location indirectly using a third party mechanism operating on the master device.

In one or more instances of the aforementioned embodiments, selecting one of the first side channel communication circuit or the second side channel communication circuit is based at least in part on a determination that a mechanism and location corresponding to the selected one of the first side channel communication circuit or the second side channel communication circuit is not utilized. In particular cases, the determination that the mechanism and location corresponding to the selected one of the first side channel communication circuit or the second side channel communication circuit is not utilized is made by a circuit in the target device. In other cases, the determination that the mechanism and location corresponding to the selected one of the first side channel communication circuit or the second side channel communication circuit is not utilized is provided to the target device from a master device via the standard communication circuit.

Other embodiments of the present inventions provide methods for side channel communications. The methods include: providing a target device. The target device includes: a standard communication circuit operable to communicate via a PCIe™ bus; and a side channel communication circuit operable to communicate via a PCIe™ extended capability structure at a defined location, where the standard communication circuit is operable to communicate via the PCIe™ bus using a mechanism other than the PCIe™ extended capability structure. The methods further include selecting the defined location.

In some instances of the aforementioned embodiments, selecting the defined location includes receiving the defined location via the standard communication circuit. In other instances of the aforementioned embodiments, selecting the defined location includes identifying by the target device a location in the PCIe™ extended capability structure which is not used. In particular instances of the aforementioned embodiments, the methods further include: using the standard communication circuit to communicate data from a public location within the target device; and using the side channel communication circuit to communicate data from a non-public location within the target device.

Yet other instances of the aforementioned embodiments provide data processing systems that include a target device. The target device includes: a standard communication circuit operable to communicate via a PCIe™ bus; a side channel communication circuit operable to communicate via a PCIe™ extended capability structure at a defined location, where the standard communication circuit is operable to communicate via the PCIe™ bus using a mechanism other than the PCIe™ extended capability structure; and a side channel selector circuit operable to select the defined location.

In some instances of the aforementioned embodiments, the systems further include a master device operable to communicate with the target device via the PCIe™ bus. In various instances of the aforementioned embodiments, the standard communication circuit provides access to a public location within the target device, and the side channel communication circuit provides access to a non-public location within the target device. In one or more instances of the aforementioned embodiments, the systems further include a master device operable to communicate with the target device via the PCIe™ bus, where the master device accesses the public location directly using a mechanism implemented in the master device, and where the master device accesses the non-public location indirectly using a third party mechanism operating on the master device. In some instances of the aforementioned embodiments, selecting the defined location is based at least in part on a determination that a location corresponding to the PCIe™ extended capability structure is not utilized. In some cases, the determination that the location corresponding to the PCIe™ extended capability structure is not utilized is made by a circuit in the target device. In other cases, the determination that the location corresponding to the PCIe™ extended capability structure is not utilized is provided to the target device from a master device via the PCIe™ bus.

Turning to FIG. 1, a bus based system 100 is shown that includes a master device 130, a target device 110, and additional devices 150, 160 all communicably connected via a bus 190. In some embodiments bus 190 is a PCIe™ bus as is known in the art. Based upon the disclosure provided herein, one of ordinary skill in the art will recognize other busses that may be used in relation to different embodiments of the inventions. Master device 130 may be any device known in the art that is capable of initiating a communication via bus 190. Master device 130 may in some cases additionally include circuitry capable of responding to communication requests initiated by other devices on bus 190. In one particular embodiment, master device 130 connects other devices on bus 190 to a host (not shown). Based upon the disclosure provided herein, one of ordinary skill in the art will recognize a variety of devices and device functions that may be used as master device 130. Target device 110 may be any device known in the art that is capable of engaging in a communication with a master device via bus 190. Target device 110 may in some cases additionally includes circuitry capable of initiating communication via bus 190. In one particular embodiment, target device 110 connects other devices on bus 190 to a storage device (not shown). Based upon the disclosure provided herein, one of ordinary skill in the art will recognize a variety of devices and device functions that may be used as master device 130. In some embodiments, both target device 110 and master device 130 may include the same bus communication capabilities that are standard to the operation of bus 190. Additional devices 150, 160 may be other target and/or master devices serving other functions within system 100.

Figure 2:
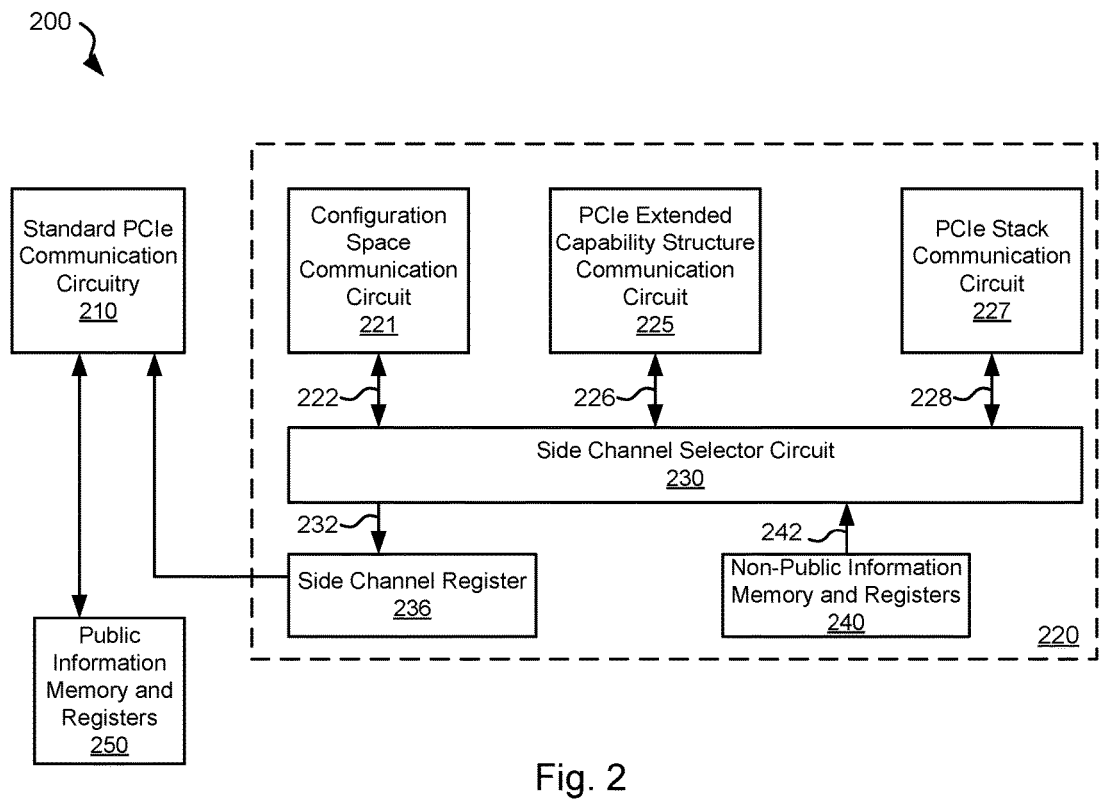
FIG. 2 depicts a target device having side channel communication support circuitry in accordance with some embodiments of the present inventions.
Figure 3:
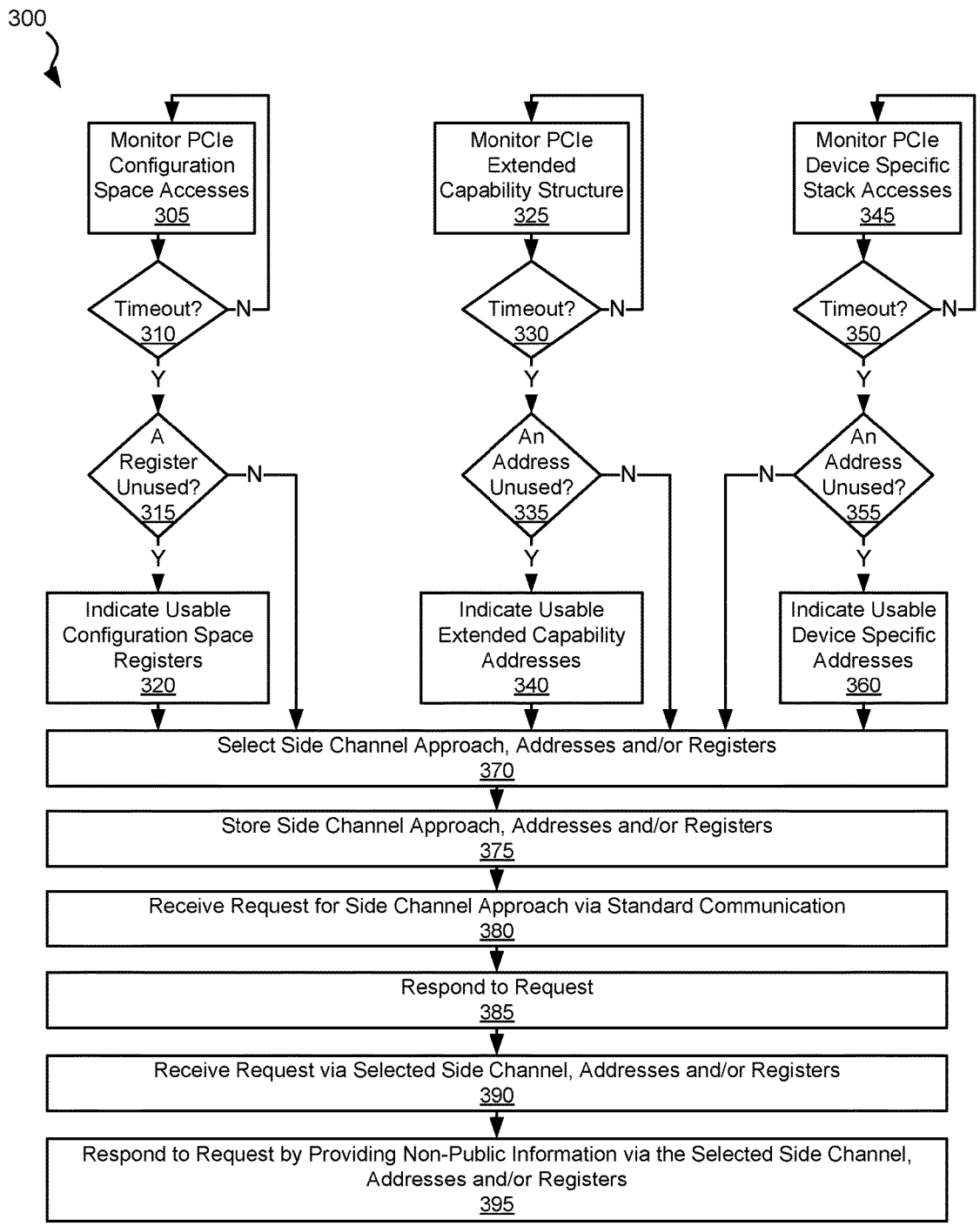
FIG. 3 is a flow diagram showing a method for enabling and utilizing a side channel communication circuit in accordance with one or more embodiments of the present inventions.
Figure 4:
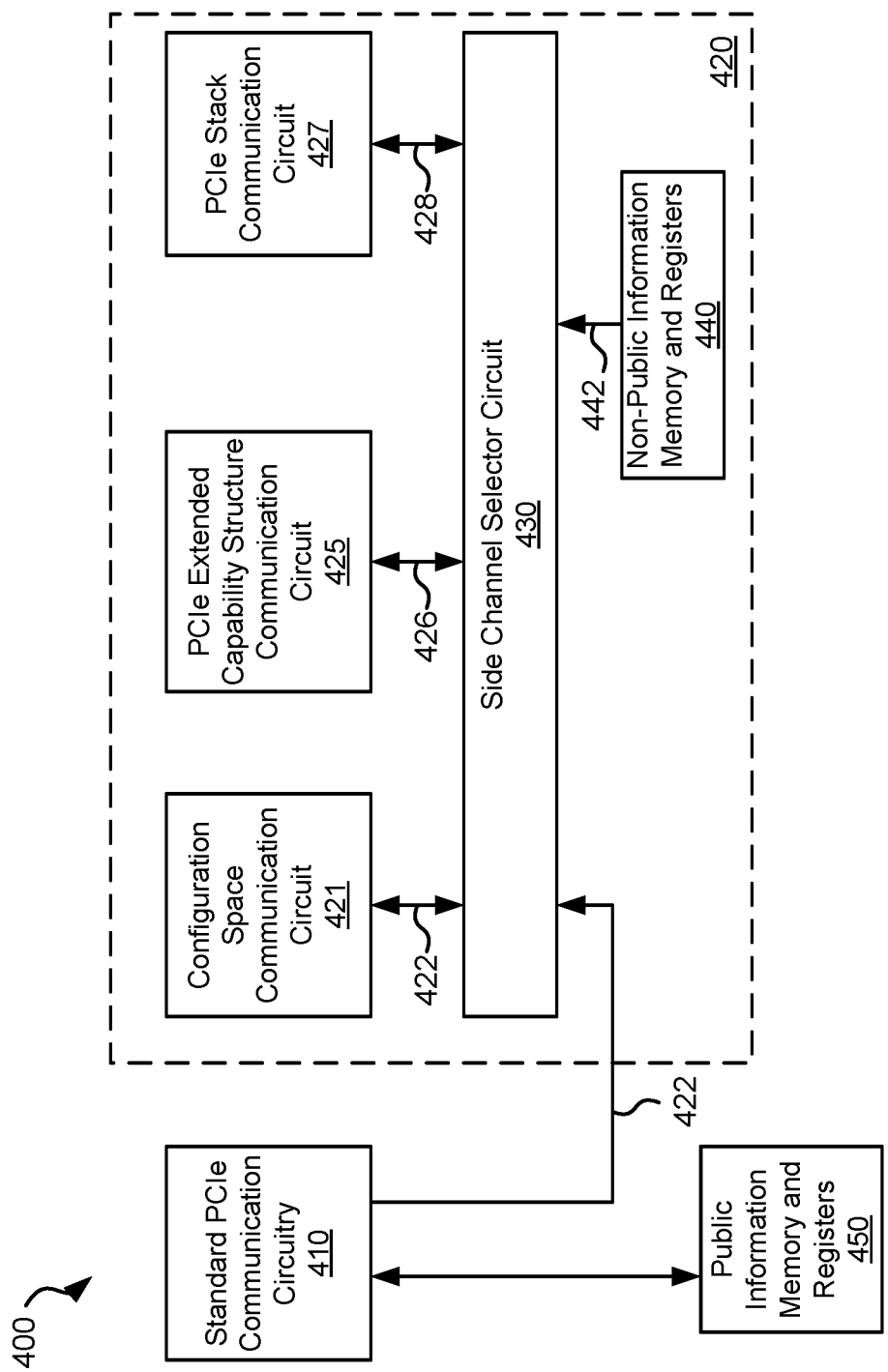
FIG. 4 depicts another target device including side channel communication support circuitry in accordance with some embodiments of the present inventions.
Figure 5:
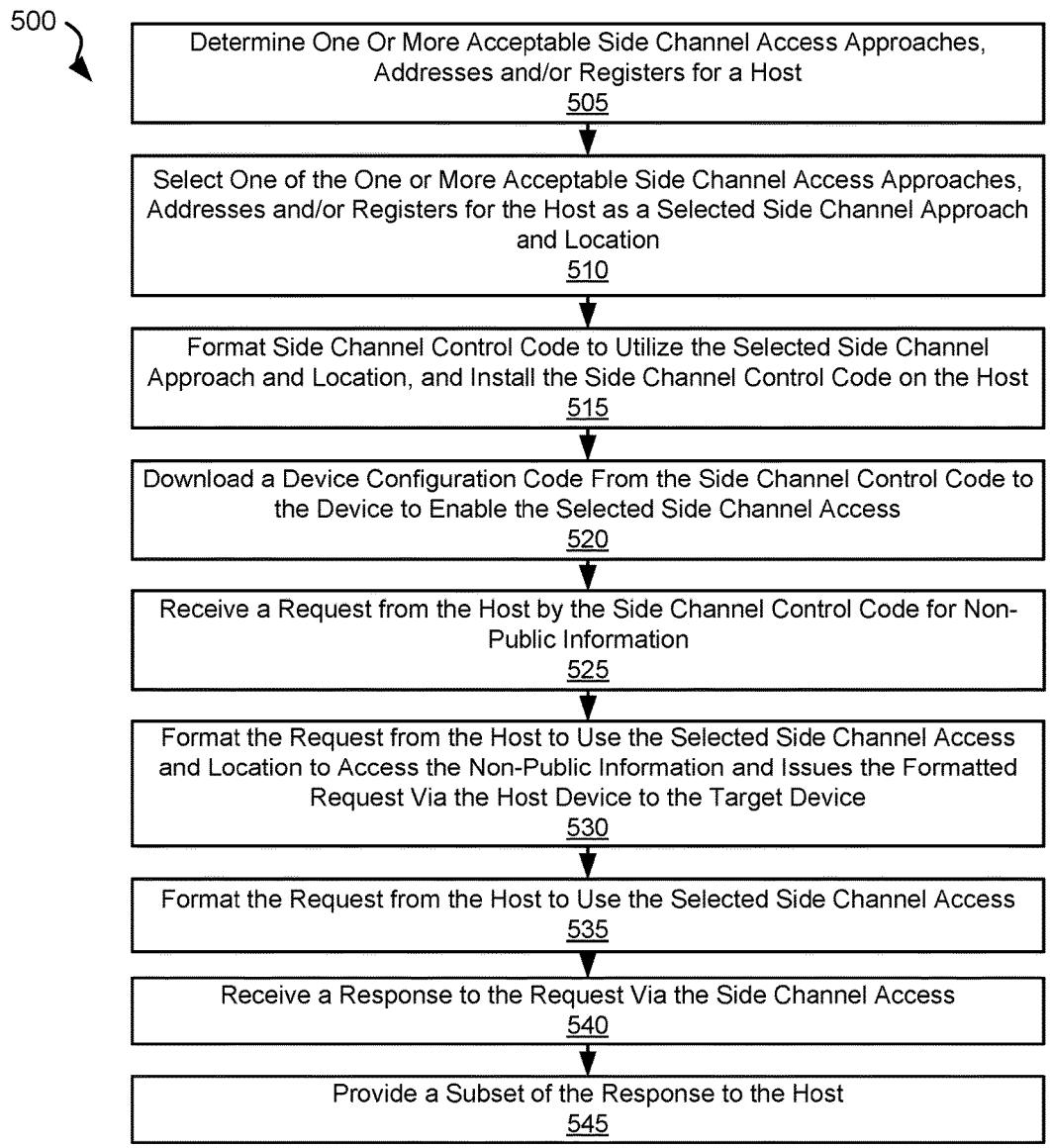
FIG. 5 is a flow diagram showing another method for enabling and utilizing a side channel communication circuit in accordance with one or more embodiments of the present inventions.

Target device 110 includes side channel communication support circuitry in accordance with one or more embodiments of the present inventions. Such side channel communication support circuitry is capable of responding to a request for non-public information via bus 190 and side channel support control code 132 executing on master device 130. Side channel support control code 132 is an executable that when operated controls configuration of the side channel communication support circuitry of target device 110 and satisfies a defined set of non-public information requests received from master device 130. By using a side channel rather than a standard channel of bus 190 and using side channel support control code 132 which is only accessible to master device 130 via an information request interface, the non-public information can be provided to the master device 130 without disclosing the mechanism for obtaining the non-public information and without allowing easy access to the non-public information to non-authorized users such as additional devices 150, 160. FIG. 2 and FIG. 4 show implementations of a target device including side channel communication support circuitry, and FIG. 3 and FIG. 5 show methods for enabling and utilizing a side channel communication circuitry.

Turning to FIG. 2, a target device 200 including a side channel communication support circuit 220 is shown in accordance with some embodiments of the present inventions. Additionally, target device 200 includes standard PCIe™ communication circuitry 210 that is able to store and retrieve information from public information memory and registers 250. Standard PCIe™ communication circuitry 210 may be any circuitry known in the art for accessing information stored in public information memory and registers 250 on target device 200 via a PCIe™ bus, and/or any circuitry known in the art for storing information to public information memory and registers 250 on target device 200. Such public information memory and registers 250 are publicly documented and available to any device capable of issuing a request to target device 200 via the PCIe™ bus.

In contrast to standard PCIe™ communication circuitry 210, side channel communication support circuit 220 includes a collection of two or more PCIe™ communication approaches that are not indicated as available or used by target device 200. As such, the PCIe™ communication approaches are not necessarily guaranteed to be supported or available to a device requesting information from target device 200. To mitigate the possibility of any one of the PCIe™ communication approaches not being supported, circuitry capable of communications via multiple approaches is included. For example, in the embodiment of FIG. 2, side channel communication support circuit 220 includes a configuration space communication circuit 221, a PCIe™ extended capability structure communication circuit 225, and a PCIe™ stack communication circuit 227.

Configuration space communication circuit 221 uses input/output instructions supported as legacy access methods as a window into the PCIe™ configuration space. To be legacy device compatible Intel™ processors support access to input/output registers 0xCF8 (address/index) and 0xCFC (data) which together are often referred to as the index-data pair. Accessing theses data and index registers results in non-posted configuration read/write cycles to be automated launched between a root complex and an endpoint on the PCIe™ bus. The PCIe™ configuration space is accessed via a register defined in accordance with the following table:

| BIST Register Portion | Header Type Register Portion | Master Latency Timer Register Portion | Cache Line Size Register Portion |
|---|---|---|---|

In some cases, communication between a master device and target device 200 is done via the cache line size portion of the register. The cache line size portion is identified in the PCIe™ specification as a read-write field for legacy compatibility purposes but has no effect on any PCI Express device behavior. Thus, use of this cache line size register area provides an opportune two way communication possibility where it is determined that the area is not otherwise being used by the root complex.

In other cases, communication between a master device and target device 200 is done via the BIST portion of the register. The BIST portion of the register is configured in accordacne with the following table:

| Start BIST | BIST Capable | Reserved | Completion Code |
|---|---|---|---| where both Start BIST and BIST Capable are single bits, Reserved is two bits, and the Completion Code represents the balance of the eight bit BIST register portion (i.e., four bits). In operation, the bus number and device number for target device 200 are obtained by side channel support code operating on the master. This information may be obtained, for example, through a call to the operating system (e.g., HWiNFO on Windows™ or lspci on Linux™). Once the bus number and device number are obtained, indexing through the index register [23:11 and 7:2] (i.e., 0xCF8[23:11 and 7:2]) is done by writing the index register [7:2] with the value 0x0C to use the cache line size register portion or with the value 0x0F to use the BIST register portion. In addition, the index register [15:11] is written with the device number, and the index register [23:16] is written with the bus number. With this indexing complete, the data register[31:0] (i.e., 0xCFC[31:0]) is written and read by the master and target device 200 to effectuate communications between the two devices.

In operation, configuration space communication circuit 221 monitors both the BIST register portion and the cache line size register portion to determine if they change during a monitoring period. This may be done by reading and re-reading the particular register portions during the monitoring period. Where no change is identified, the particular register portion is identified by configuration space communication circuit 221 as usable for side channel communications. Alternatively, where a change is identified it indicates that the particular register portion is being used by another process and/or device, and as such the particular register portion is identified by configuration space communication circuit 221 as unusable for side channel communications. The usable/unusable status of both the BIST register portion and the cache line size register portion is reported to a side channel selector circuit 230 via an input/output 222.

PCIe™ extended capability structure communication circuit 225 uses the extended capability structures of PCIe™ that can be accessed through memory mapped CPU addresses as a linked-list. It is possible that at some future point the entire space corresponding to the extended capability structures of PCIe™ may be taken up due to continuing changes in various standards. PCIe™ extended capability space spans from byte address 256 to 4095.

In operation, PCIe™ extended capability structure communication circuit 225 monitors one or more open addresses in the aforementioned range from 256 to 4095 to determine if they change during a monitoring period. This may be done by reading and re-reading the particular address(es) during the monitoring period. Where no change is identified, the particular address(es) is identified by PCIe™ extended capability structure communication circuit 225 as usable for side channel communications. Alternatively, where a change is identified it indicates that the particular address(es) is being used by another process and/or device, and as such the particular address(es) is identified by PCIe™ extended capability structure communication circuit 225 as unusable for side channel communications. The usable/unusable status of the address(es) is reported to a side channel selector circuit 230 via an input/output 226.

PCIe™ stack communication circuit 227 uses the PCIe™ to effectuate communications between a master and target device 200. Currently, the PCIe™ stack provides the optional capability to customers to carve out a 4 kB chunk of space for host access to control and status registers. The allowed address space can be located at different regions of a 64-bit address space in a somewhat random way. It is possible that the entire allowed address space may be consumed by other devices in which case access may be denied.

In operation, PCIe™ stack communication circuit 227 monitors one or more open addresses in the aforementioned allowed address space to determine if they change during a monitoring period. This may be done by reading and re-reading the particular address(es) during the monitoring period. Where no change is identified, the particular address(es) is identified by PCIe™ stack communication circuit 227 as usable for side channel communications. Alternatively, where a change is identified it indicates that the particular address(es) is being used by another process and/or device, and as such the particular address(es) is identified by PCIe™ stack communication circuit 227 as unusable for side channel communications. The usable/unusable status of the address(es) is reported to a side channel selector circuit 230 via an input/output 228.

It should be noted that while three specific approaches for communicating via PCIe™ may be included as part of the collection of two or more PCIe™ communication approaches in accordance with different embodiments of the present inventions, that other PCIe™ communication approaches may be used in relation to different embodiments of the present inventions. For example, communication via PCIe™ express capability structure, vendor defined messaging through chipset registers, management component transport protocol communications over PCIe™, and/or NVM express management interface (NVMe-MI) communciations via PCIe™ may be included in place of or in addition to those previously mentioned.

Once the monitoring period is complete, side channel selector circuit 230 selects one of the approaches (e.g., one of the aforementioned configuration space communication, PCIe™ extended capability structure, and PCIe™ stack communication, and/or another approach) and register portions or address(es) indicated as usable as a selected approach and location. Thus, for example, where both the BIST register portion and an address in the PCIe™ extended capability structure are indicated as usable while others are indicated as unusable via input/outputs 222, 226, 228, side channel selector circuit 230 selects one of either the BIST register portion and an address in the PCIe™ extended capability structure as the selected approach and location. In some cases, side channel selector circuit 230 may be hard coded to prefer one approach and location over another where two or more are available. The selected approach and location are provided as an output 232 to a side channel register 236. In addition, side channel selector circuit 230 disables all of the non-selected approaches (i.e., disables any of configuration space communication circuit 221, PCIe™ extended capability structure communication circuit 225, and/or PCIe™ stack communication circuit 227) that are not involved in the selected communication approach. In addition, side channel selector circuit 230 enables the selected approach and location (i.e., enables one of configuration space communication circuit 221 at a defined register portion, PCIe™ extended capability structure communication circuit 225 at a defined address(es), and/or PCIe™ stack communication circuit 227 at a defined address(es)) that are involved in the selected communication approach. At this juncture, side channel communication support circuit 220 is enabled to grant access to non-public information memory and registers 240 via the selected communication approach and location.

Side channel register 236 is readable by a master device via standard PCIe™ communication circuitry 210. Side channel support code executing on the master device causes the master device to read side channel register 236 and to return the information read from side channel register 230. Master device reads side channel register 236 and returns the content to the executing side channel support code without being informed about the meaning of the information being accessed. To the side channel support code executing on the master device, the information returned form the read of side channel register 236 indicates which approach and location are to be used in requesting data from non-public information memory and registers 240.

In operation, once the side channel support code executing on the master device receives the approach and location information accessed from side channel register 236 it is prepared to receive data from non-public information memory and registers 240. To obtain the data from non-public information memory and registers 240 the side channel support code executing on the master device causes master device to use the selected approach to read the location which is loaded with the data from non-public information memory and registers 240 by target device 200. Where the master device requests any data from non-public information memory and registers 240 through a call to side channel support code executing on the master device, the executing side channel support code provides the requested data without revealing the location of non-public information memory and registers 240 and the approach used for accessing non-public information memory and registers 240.

Turning to FIG. 3, a flow diagram 300 depicts a method for enabling and utilizing a side channel communication circuit in accordance with one or more embodiments of the present inventions. Following flow diagram 300, PCIe™ configuration space is monitored (block 305). This may include reading and re-reading particular register portions (e.g., a BIST register portion and a cache line size register portion) to determine if the monitored register portions change. It is determined if a timeout condition is met (block 310). The timeout condition may be a defined monitor period enforced by a target device. In some cases, the monitor period is user programmable, and in other cases the monitor period is hard wired. Where the timeout condition has not yet been met (i.e., the monitor period is not complete) (block 310), the monitoring process of block 305 is continued.

Alternatively, where the timeout condition is met (block 310), it is determined whether any of the monitored register portions in the configuration space were used (block 315). Use of a register portion is indicated whenever a change in the data stored at that location occurs during the monitor period. Where no change is indicated during the monitor period (block 315), the register portion(s) are indicated as usable within the configuration space (block 320).

In parallel, the PCIe™ extended capability structure is monitored (block 325). This may include reading and re-reading particular address(es) between 256 to 4095 of the PCIe™ extended capability structure to determine if the monitored address(es) change. It is determined if a timeout condition is met (block 330). Again, the timeout condition may be a defined monitor period enforced by a target device. In some cases, the monitor period is user programmable, and in other cases the monitor period is hard wired. Where the timeout condition has not yet been met (i.e., the monitor period is not complete) (block 330), the monitoring process of block 325 is continued.

Alternatively, where the timeout condition is met (block 330), it is determined whether any of the monitored address(es) in the PCIe™ extended capability structure were used (block 335). Use of an address indicated whenever a change in the data stored at that location occurs during the monitor period. Where no change is indicated during the monitor period (block 335), the address(es) are indicated as usable within the PCIe™ extended capability structure (block 340).

In parallel, the PCIe™ device specific stack accesses are monitored (block 345). This includes reading and re-reading one or more open addresses in the allowed address space of the PCIe™ stack to determine if they change during a monitoring period. It is determined if a timeout condition is met (block 350). Again, the timeout condition may be a defined monitor period enforced by a target device. In some cases, the monitor period is user programmable, and in other cases the monitor period is hard wired. Where the timeout condition has not yet been met (i.e., the monitor period is not complete) (block 350), the monitoring process of block 345 is continued.

Alternatively, where the timeout condition is met (block 350), it is determined whether any of the monitored address(es) in the PCIe™ stack were used (block 355). Use of an address indicated whenever a change in the data stored at that location occurs during the monitor period. Where no change is indicated during the monitor period (block 355), the address(es) are indicated as usable within the PCIe™ stack (block 360).

A side channel communication approach and a location are selected (block 370). The location may be one or more addresses and/or one or more registers or register portions used during the selected side channel communication approach. The side channel communication approach may be selected from any communication approach carried out over a bus that is different from the standard bus communication protocol. Thus, where the bus is, for example, a PCIe™ bus offering a standard communication for communicating with a device, the side channel communication approach may be selected from, but is not limited to, one or more of communication via the PCIe™ configuration space, the PCIe™ extended capability structure, the PCIe™ stack, the PCIe™ capability structure, vendor defined messaging through chipset registers, management component transport protocol communications over PCIe™, and/or NVM express management interface (NVMe-MI) communications via PCIe™. The selected side channel approach and location are stored (block 375).

A request is received for the selected side channel approach and location from a master device under the direction of side channel support control code executing on the master device (block 380). A response is provided from the target device to the side channel support control code executing via the master device and bus where the response indicates the selected approach and location (block 385). Eventually, a request is received via the selected side channel communication approach and location (block 390). The device responds to the request by providing non-public information via the communication approach and location to the side channel support control code executing on the master device (block 395). In turn, the side channel support control code executing on the master device provides a subset of the received non-public information to the master device. The non-public information is provided without disclosing the mechanism for obtaining the non-public information to the master device, and without allowing easy access to the non-public information to non-authorized users.

Turning to FIG. 4, a target device 400 including side channel communication support circuitry 420 is shown in accordance with some embodiments of the present inventions. Additionally, target device 400 includes standard PCIe™ communication circuitry 410 that is able to store and retrieve information from public information memory and registers 450. Standard PCIe™ communication circuitry 410 may be any circuitry known in the art for accessing information stored in public information memory and registers 250 on target device 200 via a PCIe™ bus, and/or any circuitry known in the art for storing information to public information memory and registers 250 on target device 200. Such public information memory and registers 250 are publicly documented and available to any device capable of issuing a request to target device 200 via the PCIe™ bus.

In contrast to standard PCIe™ communication circuitry 410, side channel communication support circuit 420 includes a collection of two or more PCIe™ communication approaches that are not indicated as available or used by target device 400. As such, the PCIe™ communication approaches are not necessarily guaranteed to be supported or available to a device requesting information from target device 400. To mitigate the possibility of any one of the PCIe™ communication approaches not being supported, circuitry capable of communications via multiple approaches is included. For example, in the embodiment of FIG. 4, side channel communication support circuit 420 includes a configuration space communication circuit 421, a PCIe™ extended capability structure communication circuit 425, and a PCIe™ stack communication circuit 427.

Configuration space communication circuit 421 uses input/output instructions supported as legacy access methods as a window into the PCIe™ configuration space. To be legacy device compatible Intel™ processors support access to input/output registers 0xCF8 (address/index) and 0xCFC (data) which together are often referred to as the index-data pair. Accessing theses data and index registers results in non-posted configuration read/write cycles to be automated launched between a root complex and an endpoint on the PCIe™ bus. The PCIe™ configuration space is accessed via a register defined in accordance with the following table:

| BIST Register Portion | Header Type Register Portion | Master Latency Timer Register Portion | Cache Line Size Register Portion |
|---|---|---|---|

In some cases, communication between a master device and target device 400 is done via the cache line size portion of the register. The cache line size portion is identified in the PCIe™ specification as a read-write field for legacy compatibility purposes but has no effect on any PCI Express device behavior. Thus, use of this cache line size register area provides an opportune two way communication possibility where it is determined that the area is not otherwise being used by the root complex.

In other cases, communication between a master device and target device 400 is done via the BIST portion of the register. The BIST portion of the register is configured in accordacne with the following table:

| Start BIST | BIST Capable | Reserved | Completion Code |
|---|---|---|---| where both Start BIST and BIST Capable are single bits, Reserved is two bits, and the Completion Code represents the balance of the eight bit BIST register portion (i.e., four bits). In operation, the bus number and device number for target device 400 are obtained by side channel support code operating on the master. This information may be obtained, for example, through a call to the operating system (e.g., HWiNFO on Windows™ or lspci on Linux™). Once the bus number and device number are obtained, indexing through the index register [23:11 and 7:2] (i.e., 0xCF8[23:11 and 7:2]) is done by writing the index register [7:2] with the value 0x0C to use the cache line size register portion or with the value 0x0F to use the BIST register portion. In addition, the index register [15:11] is written with the device number, and the index register [23:16] is written with the bus number. With this indexing complete, the data register[31:0] (i.e., 0xCFC[31:0]) is written and read by the master and target device 400 to effectuate communications between the two devices.

PCIe™ extended capability structure communication circuit 225 uses the extended capability structures of PCIe™ that can be accessed through memory mapped CPU addresses as a linked-list. It is possible that at some future point the entire space corresponding to the extended capability structures of PCIe™ may be taken up due to continuing changes in various standards. PCIe™ extended capability space spans from byte address 256 to 4095.

PCIe™ stack communication circuit 427 uses the PCIe™ to effectuate communications between a master and target device 400. Currently, the PCIe™ stack provides the optional capability to customers to carve out a 4 kB chunk of space for host access to control and status registers. The allowed address space can be located at different regions of a 64-bit address space in a somewhat random way. It is possible that the entire allowed address space may be consumed by other devices in which case access may be denied.

It should be noted that while three specific approaches for communicating via PCIe™ may be included as part of the collection of two or more PCIe™ communication approaches in accordance with different embodiments of the present inventions, that other PCIe™ communication approaches may be used in relation to different embodiments of the present inventions. For example, communication via PCIe™ express capability structure, vendor defined messaging through chipset registers, management component transport protocol communications over PCIe™, and/or NVM express management interface (NVMe-MI) communications via PCIe™ may be included in place of or in addition to those previously mentioned.

In operation, side channel support code executing on a master device causes the master device to write a selection command to a side channel selector circuit 430 via standard PCIe™ communication circuitry 410. The command indicates a selected side channel communication approach and a location via a selection output 422. The selected approach may be identified by confirming which of the side channel communication approaches and/or locations supported by target device 400 are not utilized by the master device executing the side channel support code. Once selected, side channel selector circuit 430 enables one of the approaches (e.g., one of the aforementioned configuration space communication, PCIe™ extended capability structure, and PCIe™ stack communication, and/or another approach) and register portions or address(es) indicated by the selection, and disables the other approaches. At this juncture, side channel communication support circuitry 420 is enabled to grant access to non-public information memory and registers 440 via the selected communication approach and location.

Once the side channel support code executing on the master device has set up the side channel communication approach and location, it is prepared to receive data from non-public information memory and registers 440. To obtain the data from non-public information memory and registers 4240 the side channel support code executing on the master device causes master device to use the selected approach to read the location which is loaded with the data from non-public information memory and registers 440 by target device 400. Where the master device requests any data from non-public information memory and registers 440 through a call to side channel support code executing on the master device, the executing side channel support code provides the requested data without revealing the location of non-public information memory and registers 440 and the approach used for accessing non-public information memory and registers 440.

Turning to FIG. 5, a flow diagram 500 shows another method for enabling and utilizing a side channel communication circuit in accordance with one or more embodiments of the present inventions. Following flow diagram 500, one or more acceptable side channel access approaches are determined based upon a particular host device (i.e., master device) (block 505). This may include, for example, assuring that a vendor of the host device does not use a given side channel approach and/or location supported by the target device. One of the one or more identified acceptable side channel communication approaches is selected as a selected side channel approach and location (block 510).

A side channel control code is modified or formatted to utilize the selected side channel approach and location (block 515). This side channel control code is then installed and executed on the host device. A device configuration code is downloaded to the target device by the master device under the direction of the side channel control code via a standard PCIe™ communications circuit (block 520). This device configuration code when installed on the target device causes selection of the selected side channel approach and location by enabling a circuit within the target device that implements the selected communication approach.

A request is received by the side channel control code from the host for non-public information (block 525). The side channel control code formats the request to use the selected side channel communication approach and location (block 530). The formatted request for non-public information is issued to the target device by the host device using the selected side channel communication and approach (block 535). The request is fielded by the communication circuit corresponding to the selected side channel communication approach in the target device. The target device executes the request by providing the non-public information via the selected side channel communication approach and location to the requesting side channel control code executing on the host device (block 540). The side channel control code provides a subset of the non-public information to the requesting host (block 545).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent—albeit such an entirely software or firmware system would not be a circuit. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
a target device, wherein the target device includes:
a standard communication circuit; and
a side channel communication system including:
a first side channel communication circuit;
a second side channel communication circuit, wherein all of the standard communication circuit, the first side channel communication circuit, and the second side channel communication circuit communicate via a common bus but by different communication mechanisms; and
a side channel selector circuit operable to select one of the first side channel communication circuit or the second side channel communication circuit to perform side channel communications for the target device,
wherein selecting one of the first side channel communication circuit or the second side channel communication circuit is based at least in part on a determination that a mechanism and a location corresponding to the selected one of the first side channel communication circuit or the second side channel communication circuit is not utilized, and
wherein the determination that the mechanism and the location corresponding to the selected one of the first side channel communication circuit or the second side channel communication circuit is not utilized is made by a circuit in the target device.

2. The system of claim 1, wherein the common bus is a PCie™ bus, and wherein the first side channel communication circuit is selected from a group consisting of: a circuit operable to communicate via a PCie™ configuration space, a circuit operable to communicate via a PCie™ extended capability structure, and a circuit operable to communicate via a PCie™ stack.

3. The system of claim 1, the system further comprising:
a master device operable to communicate with the target device via the common bus.

4. The system of claim 1, wherein the standard communication circuit provides access to a public location within the target device, and wherein the side channel communication system provides access to a non-public location within the target device.

5. The system of claim 4, the system further comprising:
a master device operable to communicate with the target device via the common bus, wherein the master device accesses the public location directly using a mechanism implemented in the master device, and wherein the master device accesses the non-public location indirectly using a third party mechanism operating on the master device.

6. The system of claim 1, wherein the first side channel communication circuit is a circuit operable to communicate via a PCie™ extended capability structure.

7. The system of claim 6, wherein the standard communication circuit is operable to communicate via the common bus using a mechanism other than the PCie™ extended capability structure.

8. The system of claim 1, wherein the target device is a storage device.

9. A data processing system, the system comprising:
a target device, wherein the target device includes:
a standard communication circuit; and
a side channel communication system including:
a first side channel communication circuit;
a second side channel communication circuit, wherein all of the standard communication circuit, the first side channel communication circuit, and the second side channel communication circuit communicate via a common bus but by different communication mechanisms; and
a side channel selector circuit operable to select one of the first side channel communication circuit or the second side channel communication circuit to perform side channel communications for the target device; and
a master device operable to communicate with the target device via the common bus;
wherein selecting one of the first side channel communication circuit or the second side channel communication circuit is based at least in part on a determination that a mechanism and a location corresponding to the selected one of the first side channel communication circuit or the second side channel communication circuit is not utilized, and
wherein the determination that the mechanism and the location corresponding to the selected one of the first side channel communication circuit or the second side channel communication circuit is not utilized is provided to the target device from the master device via the standard communication circuit.

10. A method for side channel communications, the method comprising:
providing a target device, the target device including:
a standard communication circuit operable to communicate via a PCie™ bus; and
a side channel communication circuit operable to communicate via a PCie™ extended capability structure at a defined location, wherein the standard communication circuit is operable to communicate via the PCie™ bus using a mechanism other than the PCie™ extended capability structure; and
selecting the defined location.

11. The method of claim 10, wherein selecting the defined location comprises:
receiving the defined location via the standard communication circuit.

12. The method of claim 10, wherein selecting the defined location comprises:
identifying by the target device a location in the PCie™ extended capability structure which is not used.

13. The method of claim 10, the method further comprising:
using the standard communication circuit to communicate data from a public location within the target device; and
using the side channel communication circuit to communicate data from a non-public location within the target device.

14. A data processing system, the system comprising:
a target device, wherein the target device includes:
a standard communication circuit operable to communicate via a PCie™ bus;
a side channel communication circuit operable to communicate via a PCie™ extended capability structure at a defined location, wherein the standard communication circuit is operable to communicate via the PCie™ bus using a mechanism other than the PCie™ extended capability structure; and
a side channel selector circuit operable to select the defined location.

15. The system of claim 14, the system further comprising:

a master device operable to communicate with the target device via the PCie™ bus.

16. The system of claim 14, wherein the standard communication circuit provides access to a public location within the target device, and wherein the side channel communication circuit provides access to a non-public location within the target device.

17. The system of claim 14, the system further comprising:
a master device operable to communicate with the target device via the PCie™ bus, wherein the master device accesses a public location within the target device directly using a mechanism implemented in the master device, and wherein the master device accesses a non-public location within the target device indirectly using a third party mechanism operating on the master device.

18. The system of claim 14, wherein selecting the defined location is based at least in part on a determination that a location corresponding to the PCie™ extended capability structure is not utilized.

19. The system of claim 18, wherein the determination that the location corresponding to the PCie™ extended capability structure is not utilized is made by a circuit in the target device.

20. The system of claim 18, wherein the determination that the location corresponding to the PCie™ extended capability structure is not utilized is provided to the target device from a master device via the PCie™ bus.

* * * * *